US012784359B2

(12) United States Patent
Zielonka et al.

(10) Patent No.: US 12,784,359 B2
(45) Date of Patent: Nov. 3, 2026

(54) 3D MODELING OF INCIDENT SCENE USING BODY WORN CAMERAS

(71) Applicant: MOTOROLA SOLUTIONS, INC., Chicago, IL (US)

(72) Inventors: Bartosz J. Zielonka, Pozna (PL); Grzegorz Chwierut, Cracow (PL); Robert Godula, Kaniów (PL); Mateusz Slawek, Cracow (PL); Leszek Wojcik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 483 days.

(21) Appl. No.: 18/247,737

(22) PCT Filed: Oct. 26, 2020

(86) PCT No.: PCT/PL2020/050077
§ 371 (c)(1),
(2) Date: Apr. 3, 2023

(87) PCT Pub. No.: WO2022/093053
PCT Pub. Date: May 5, 2022

(65) Prior Publication Data
US 2023/0419608 A1 Dec. 28, 2023

(51) Int. Cl.
*G06T 17/10* (2006.01)
*G01S 17/894* (2020.01)

(52) U.S. Cl.
CPC ............ *G06T 17/10* (2013.01); *G01S 17/894* (2020.01)

(58) Field of Classification Search
None
See application file for complete search history.

(56) References Cited

U.S. PATENT DOCUMENTS 8,504,640 B2 8/2013 Rios et al.
9,584,774 B2 2/2017 Bekiares et al.
(Continued)

FOREIGN PATENT DOCUMENTS

CN 110876035 A 3/2020
WO 2017031389 A1 2/2017
WO 2017133910 A1 8/2017

OTHER PUBLICATIONS

Cui, et al., "3D Shape Scanning with a Time-of-Flight Camera," 2010 IEEE Computer Society Conference on Computer Vision and Pattern Recognition, San Francisco, CA, USA, 2010, (pp. 1173-1180).

(Continued)

*Primary Examiner* — Nurun Flora
(74) *Attorney, Agent, or Firm* — Michael Best & Friedrich LLP

(57) ABSTRACT

Method and 3D modeling server (110) to generate a 3D model. The method includes receiving first images captured by a camera (320) corresponding to an incident scene and receiving first metadata generated by a time-of-flight sensor (325) corresponding to the first images. The method also includes generating a 3D model at a first resolution including a plurality of 3D points based on the first images and the first metadata and identifying a first incident-specific point of interest from the first images. The method further includes transmitting for recapturing the first incident-specific point of interest and receiving second images captured of the first incident-specific point of interest. The method also includes receiving second metadata generated corresponding to the second images and updating a first portion of the 3D model corresponding to the first incident-specific point of interest to a second resolution based on the second images and the second metadata.

20 Claims, 8 Drawing Sheets

(56) References Cited

U.S. PATENT DOCUMENTS

| | | | |
|---|---|---|---|
| 9,652,828 B1 | 5/2017 | Sabripour et al. | |
| 9,977,429 B2 | 5/2018 | Lee et al. | |
| 2016/0005211 A1 | 1/2016 | Sarkis et al. | |
| 2017/0178392 A1* | 6/2017 | Zuccarino | G06T 15/205 |
| 2019/0051046 A1 | 2/2019 | Jin et al. | |
| 2019/0088014 A1* | 3/2019 | Richards | G06T 19/00 |
| 2021/0124960 A1* | 4/2021 | Lee | G06N 3/08 |
| 2022/0382968 A1* | 12/2022 | Lim | G06T 11/60 |

OTHER PUBLICATIONS

D'apuzzo, "Recent Advances in 3D Full Body Scanning With Applications To Fashion and Apparel," 2009 (10 pages).

Franca, et al., "A 3D Scanning System Based On Laser Triangulation and Variable Field of View," IEEE International Conference on Image Processing 2005, Genova, 2005, (pp. I-425).

Guidi, et al., "Multiscale Archaeological Survey Based On the Integration of 3D Scanning and Photogrammetry," 2002 (8 pages).

Tong, et al. "Scanning 3D Full Human Bodies Using Kinects," vol. 18, No. 04, 2012, (pp. 643-650).

Van Rees, "A 3D scanner in every pocket?" Geo Week News, published Sep. 3, 2019 <https://www.geoweeknews.com/news/a-3d-scanner-in-every-pocket> (6 pages).

Youtube, "3D Scanning with a Drone?—CGC Weekly #10" posted by CG Cookie on Jun. 7, 2018 <https://www.youtube.com/watch?v=0ueKdZvxdwQ> (1 page).

International Search Report and Written Opinion for Related Application No. PCT/PL2020/050077 dated Mar. 25, 2021 (13 pages).

* cited by examiner

3D MODELING OF INCIDENT SCENE USING BODY WORN CAMERAS

BACKGROUND OF THE INVENTION

A large portion of the work conducted by public safety organizations involves incident scene investigation. For example, police departments perform crime scene investigations and crash investigations, fire departments perform fire incident investigations to determine the cause, and the like. During a typical incident scene investigation, a photographer captures several images of the incident scene. These images are later used for investigation and evidentiary purposes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
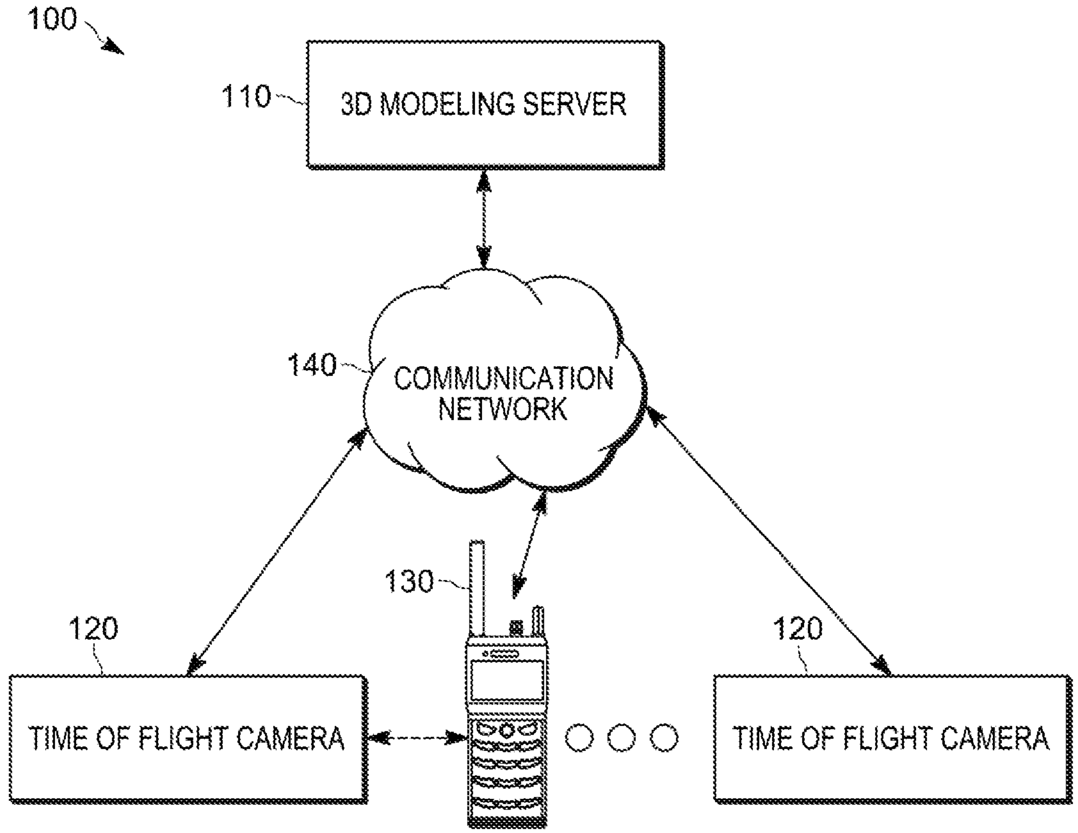
FIG. 1 is a three-dimensional (3D) modeling communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

Incident scene photographers have limited time to capture images of the incident scene. Incident scene investigators then rely on these images or photographs for their investigations and eventually for evidentiary purposes. Investigators typically spend a lot of man hours analyzing the photographs to understand an incident-scene and to conduct their investigation. Most images provide a two-dimensional representation of an incident scene. Two dimension images often lack or distort information, for example, dimensions, size, shape, and the like of objects at the incident scene.

Accordingly, there is a need to construct a 3D model using the incident scene images that will reduce the loss of incident scene information and improve efficiency of incident scene investigations.

One embodiment provides a method for generating a three-dimensional (3D) model including receiving, at an electronic processor, one or more first images captured by a camera corresponding to an incident scene and receiving, at the electronic processor, first metadata generated by a time-of-flight sensor corresponding to the one or more first images. The method also includes generating, using the electronic processor, a scene specific 3D model at a first resolution including a plurality of 3D points based on the one or more first images and the first metadata and identifying, using the electronic processor, a first incident-specific point of interest from the one or more first images. The method further includes transmitting, using the electronic processor, one or more first commands for recapturing the first incident-specific point of interest and receiving, at the electronic processor, one or more second images captured of the first incident-specific point of interest. The method also includes receiving, at the electronic processor, second metadata generated corresponding to the one or more second images and updating, using the electronic processor, a first portion of the scene specific 3D model corresponding to the first incident-specific point of interest to a second resolution based on the one or more second images and the second metadata. The second resolution being higher than the first resolution.

Another embodiment provides a three-dimensional (3D) modeling server for generating a 3D model. The 3D modeling server includes a transceiver enabling communication between the 3D modeling server, a camera, and a time-of-flight sensor and an electronic processor coupled to the transceiver. The electronic processor is configured to receive, one or more first images captured by the camera corresponding to an incident scene and receive first metadata generated by the time-of-flight sensor corresponding to the one or more first images. The electronic processor is also configured to generate an scene specific 3D model at a first resolution including a plurality of 3D points based on the one or more first images and the first metadata and identify a first incident-specific point of interest from the one or more first images. The electronic processor is further configured to transmit one or more first commands for recapturing the first incident-specific point of interest and receive one or more second images captured of the first incident-specific point of interest. The electronic processor is also configured to receive second metadata generated corresponding to the one or more second images and update a first portion of the scene specific 3D model corresponding to the first incident-specific point of interest to a second resolution based on the one or more second images and the second metadata. The second resolution being higher than the first resolution.

FIG. 1 illustrates an example system 100 for three-dimensional (3D) modeling. The system 100 includes a 3D modeling server 110 communicating with a plurality of time-of-flight cameras 120 and a plurality of portable communications devices 130 associated with the plurality of time-of-flight cameras 120 over a communication network 140. The system 100 may include more or fewer components than those illustrated in FIG. 1 and may perform additional functions other than those described herein. The 3D modeling server 110 is a computing device implemented in a cloud infrastructure or located at a public safety organization investigation center or other location. The plurality of time-of-flight cameras 120 include, for example, body-worn cameras worn by public safety personnel, dashboard cameras mounted on public safety vehicles, stand-alone cameras carried by incident scene photographers, cameras provided on unmanned aerial vehicles, and the like. The plurality of time-of-flight cameras 120 may be singularly referred to as a time-of-flight camera 120.

The plurality of portable communications devices 130 include, for example, portable two-way radios, mobile two-way radios, smart telephones, smart wearable devices, tablet computers, laptop computers, and the like. The plurality of portable communications devices 130 are associated with the plurality of time-of-flight cameras 120. The 3D modeling server 110 may provide commands and/or instructions for operating the time-of-flight camera 120 over the associated portable communications device 130. In one example, when the time-of-flight camera 120 is a body worn camera, the associated portable communications device 130 is a portable two-way radio of the public safety personnel wearing the body-worn camera. In another example, when the time-of-flight camera 120 is a dashboard camera, the associated portable communications device 130 may be a mobile two-way radio provided in the vehicle or a portable two-way radio of the public safety personnel operating the vehicle. In some embodiments, the time-of-flight cameras 120 may not be associated with a portable communications device 130. For example, when the time-of-flight camera 120 is mounted to an unmanned aerial vehicle, the time-of-flight camera 120 may not have a portable communications device 130 associated with the unmanned aerial vehicle. In these embodiments, the commands or instructions for operating the time-of-flight camera 120 are provided directly to the unmanned aerial vehicle, which is automatically controlled based on the commands or instructions. The communication network 140 is for example, a cellular network, a mobile radio network, and the like. The communication network 140 may be a public network or a public safety network set-up for the public safety organization.

Figure 2:
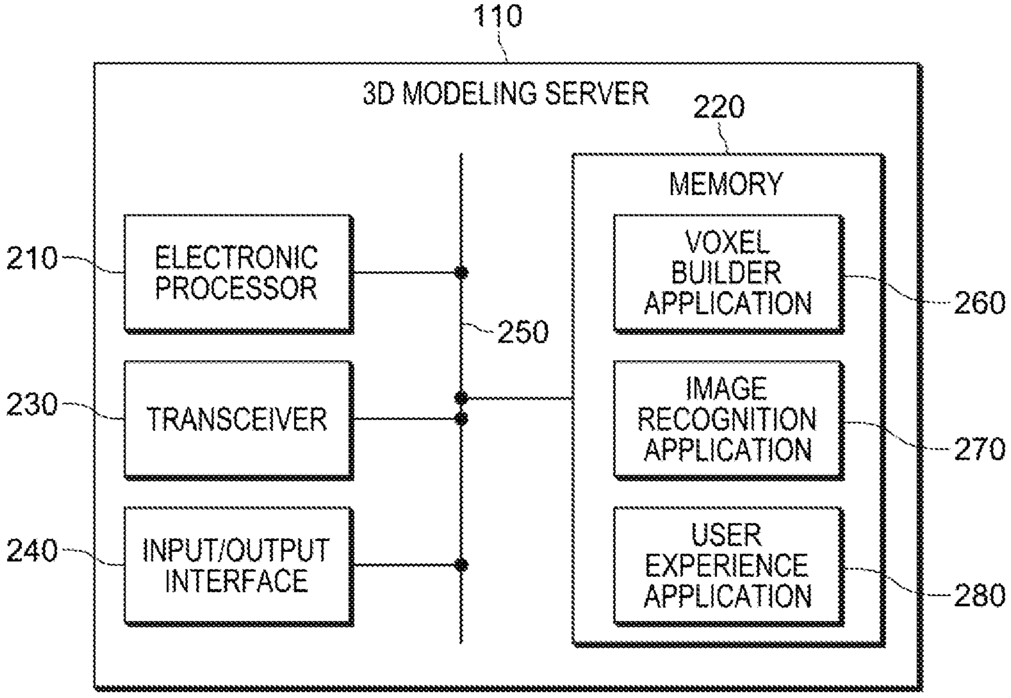
FIG. 2 is a block diagram of a 3D modeling server of the system of FIG. 1 in accordance with some embodiments.

FIG. 2 is a block diagram of one embodiment of the 3D modeling server 110. In the example illustrated, the 3D modeling server 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example embodiment of the 3D modeling server 110. The 3D modeling server 110 may include more or fewer components and may perform additional functions other than those described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be a special purpose processor designed to implement neural networks for machine learning. In other embodiments, the electronic processor 210 may be implemented using multiple processors. In addition, the electronic processor 210 may be implemented partially or entirely as, for example, a field programmable gate array (FPGA), an applications-specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the 3D modeling server 110 described herein. The memory 220 may include, for example, a program storage area and a data storage area. The program storage area and the data storage area may include combinations of different types of memory, such as read-only memory, and random-access memory. In some embodiments, the 3D modeling server 110 may include one electronic processor 210, and/or plurality of electronic processors 210, for example, in a cluster arrangement, one or more of which may be executing none, all, or a portion of the applications of the 3D modeling server 110 described below, sequentially or in parallel across the one or more electronic processors 210. The one or more electronic processors 210 comprising the 3D modeling server 110 may be geographically co-located or may be geographically separated and interconnected via electrical and/or optical interconnects. One or more proxy servers or load balancing servers may control which one or more electronic processors 210 perform any part or all of the applications provided below.

The transceiver 230 enables wired and/or wireless communication between the 3D modeling server 110, the plurality of time-of-flight cameras 120, and the plurality of portable communications devices 130 over the communication network 140. In some embodiments, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

In the example illustrated, the memory 220 stores several applications that are executed by the electronic processor 210. In the example illustrated, the memory 220 includes a voxel builder application 260, an image recognition application 270, and a user experience application 280. The voxel builder application 260 is executed to create the 3D model of the incident scene from the images and metadata received from the time-of-flight camera 120. The image recognition application 270 is executed to recognize points of interest in the images received from the time-of-flight camera 120. The user experience application 280 is executed to provide instructions to a user or unmanned camera to capture additional images as desired for building the 3D model of the incident scene.

In the example provided in FIG. 2, a single device is illustrated as including all the components and the applications of the 3D modeling server 110. However, it should be understood that one or more of the components and one or more of the applications may be combined or divided into separate software, firmware and/or hardware. Regardless of how they are combined or divided, these components and applications may be executed on the same computing device or may be distributed among different computing devices connected by one or more networks or other suitable communication means. In one example, all the components and applications of the 3D modeling server 110 are implemented in a cloud infrastructure accessible through several terminal devices, with the processing power located at a server location. In another example, the components and applications of the 3D modeling server 110 may be divided between separate investigation center computing devices co-located at an investigation center of a public safety organization (e.g., a police department). In yet another example, the components and applications of the 3D modeling server 110 may be divided between separate computing devices not co-located with each other but communicatively connected with each other over a suitable communication network.

Figure 3:
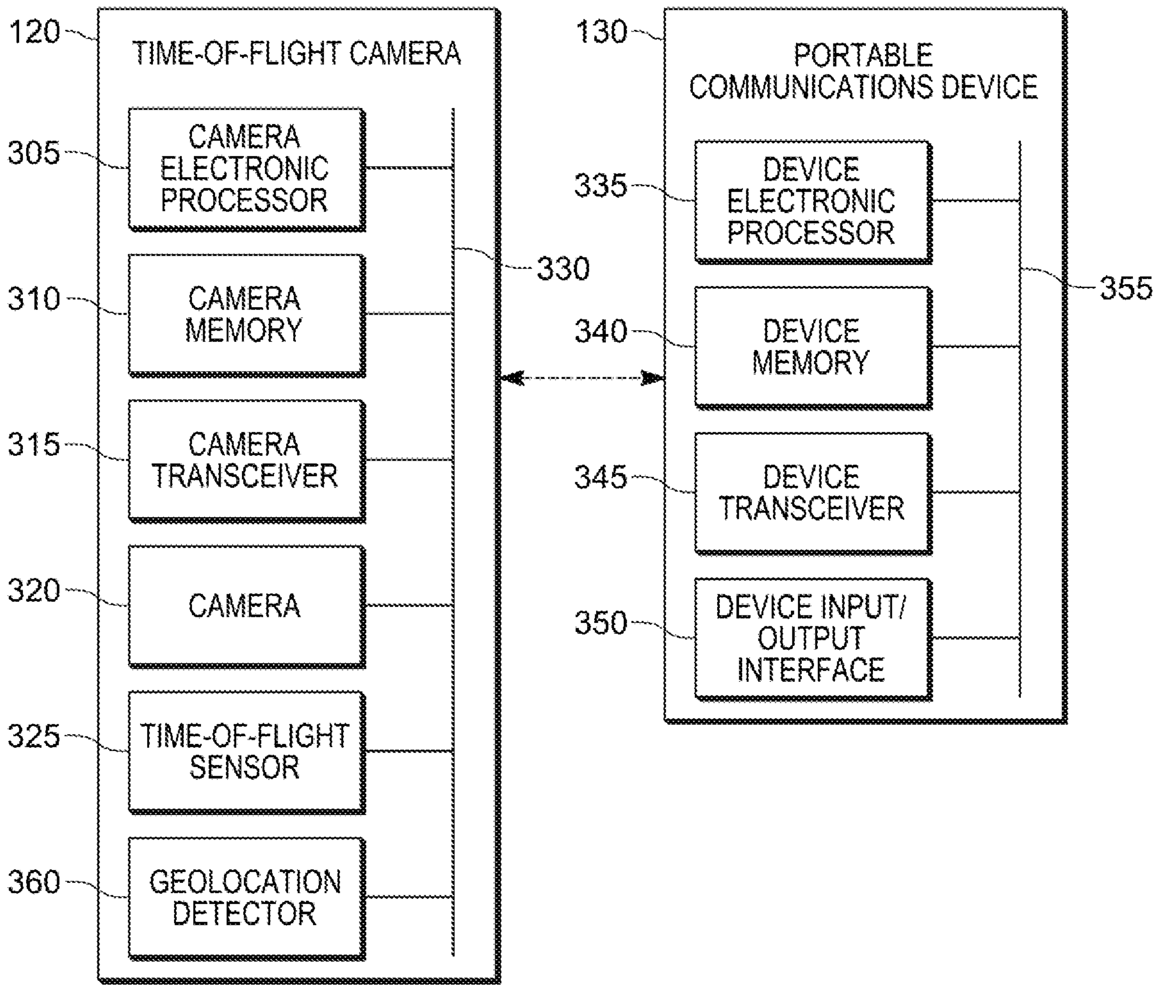
FIG. 3 is a block diagram of a time-of-flight camera and an associate portable communications device of the system of FIG. 1 in accordance with some embodiments.

FIG. 3 is a block diagram of one embodiment of the time-of-flight camera 120 and an associated portable communications device 130. The portable communications device 130 is an optional component. In the example illustrated, the time-of-flight camera 120 includes a camera electronic processor 305, a camera memory 310, a camera transceiver 315, a camera 320, a time-of-flight sensor 325, and a geolocation detector 360. The camera electronic processor 305, the camera memory 310, the camera transceiver 315, the camera 320, the time-of-flight sensor 325, and the geolocation detector 360 communicate over one or more control and/or data buses (for example, a camera communication bus 330). In the example illustrated, the portable communications device 130 includes a device electronic processor 335, a device memory 340, a device transceiver 345, and a device input/output interface 350. The device electronic processor 335, the device memory 340, the device transceiver 345, and the device input/output interface 350 communication over one or more control and/or data buses (for example, a device communication bus 355). FIG. 3 illustrates only one example embodiment of the time-of-flight camera 120 and the portable communications device 130. The time-of-flight camera 120 and the portable communications device 130 may include more or fewer components and may perform functions other than those explicitly described herein. In one example, rather than having an associated portable communications device 130, the time-of-flight camera 120 may include a speaker to provide instructions for capturing images. In another example, the instructions may be provided directly to the time-of-flight camera 120 or a device carrying the time-of-flight camera 120 such that the time-of-flight camera 120 may be automatically positioned and the images captured according to the instructions.

The camera electronic processor 305, the camera memory 310, the camera transceiver 315, the device electronic processor 335, the device memory 340, the device transceiver 345, and the device input/output interface 350 are implemented similar to the electronic processor 210, the memory 220, the transceiver 230, and the input/output interface 240.

The camera 320 may be capable of capturing both still images and moving images. The time-of-flight sensor 325 allows for measuring the distance between the time-of-flight sensor 325 and an object in the line of sight of the time-of-flight sensor 325. In some embodiments, the time-of-flight sensor 325 is a light-based sensor. The time-of-flight sensor 325 may include a light emitter to produce a light signal and a detector to detect the light signal after being reflected from an object. The distance between the time-of-flight sensor 325 and the object is determined based on the roundtrip time of the light signal from the emitter to the detector. In some embodiments, the time-of-flight sensor 325 is a sound-based sensor. The time-of-flight sensor 325 may include, for example, a sound emitter to produce an ultrasonic signal and a detector to detect the ultrasonic signal after being reflected from an object. The distance between the time-of-flight sensor 325 and the object is determined based on the roundtrip time of the ultrasonic signal from the emitter to the detector. In other embodiments, the time-of-flight sensor 325 may use other known technologies to determine the distance between the time-of-flight sensor 325 and the objects.

In the example illustrated, the camera 320 and the time-of-flight sensor 325 are shown as being co-located in a single device. However, in some embodiments, the camera 320 and the time-of-flight sensor 325 may be provide in separate devices. For example, the camera 320 may be a body worn camera of a public safety personnel and the time-of-flight sensor 325 may be provided in the portable communications device 130 associated with the camera 320. In some embodiments, the time-of-flight camera 120 may not include a separate transceiver, and the images and the metadata are transmitted to the 3D modeling server 110 using the associated portable communications device 130.

In one example, the geolocation detector 360 is a global positioning system (GPS) chip. The geolocation detector 360 communicates with a satellite to determine the current coordinates or location of the time-of-flight camera 120. The location of the time-of-flight camera 120 is provided as part of the metadata transferred from the time-of-flight camera 120 to the 3D modeling server 110. The geolocation detector 360 may include other systems to determine the location of the time-of-flight camera 120, for example, an inertial measurement unit or other technologies.

The camera 320 captures one or more images of portions of an incident scene. The camera 320 and the time-of-flight sensor 325 also generate metadata corresponding to each image. The metadata includes, for example, time-of-flight data indicating distances between the time-of-flight sensor 325 and a plurality of points in the one or more first images, a location and an angle of positioning of the camera 320 when the one or more images are captured. The one or images and the corresponding metadata are then transmitted to the 3D modeling server 110 for generating a 3D model of the incident scene.

Figure 4:
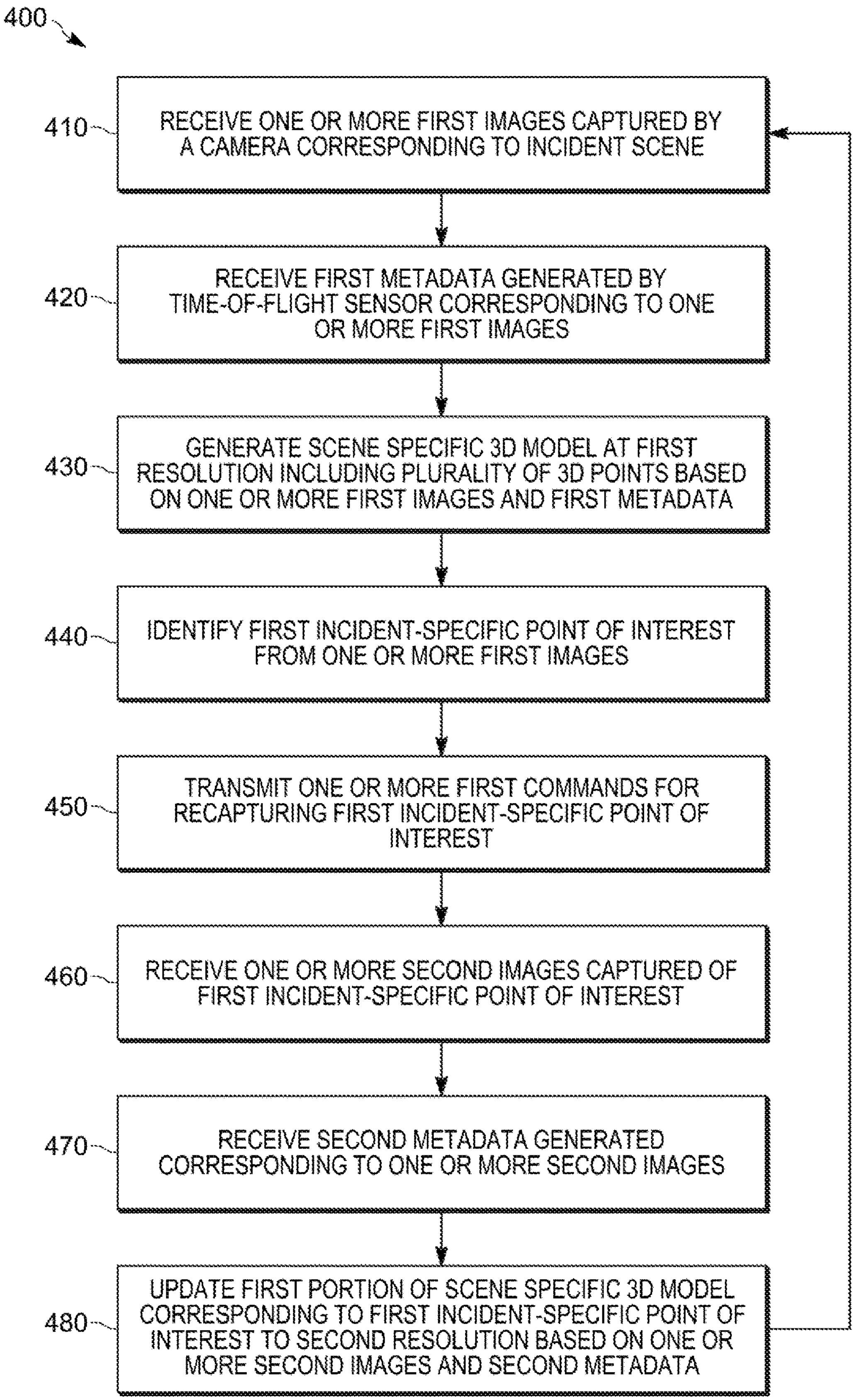
FIG. 4 is a flowchart of a method for generating a 3D model in accordance with some embodiments.

FIG. 4 illustrates a flowchart of an example method 400 for generating a 3D model. In the example illustrated the method 400 includes receiving, at the electronic processor 210, one or more first images captured by the camera 320 corresponding to an incident scene (at block 410). The camera 320 of the time-of-flight camera 120 captures the one or more images at the incident scene. The one or more first images are captured at the incident scene by, for example, body-worn cameras of public safety personnel responding to the incident. In one example, the incident may be a car crash with police officers responding to the scene of the car crash to capture images for investigating the car crash. The one or more images may be captured based on an initial set of guidelines (for example, second capture criteria) provided to the public safety personnel or to the device capturing the images. For example, a plurality of camera angles, camera positions, and the like may be standard or provided to the public safety personnel responding to the incident. Once the one or more first images are captured, the time-of-flight camera 120 transmits the one or more first images to the 3D modeling server 110.

The method 400 includes receiving, at the electronic processor 210, first metadata generated by the time-of-flight sensor 325 corresponding to the one or more first images (at block 420). At or around the same time as the one or more first images are being captured by the camera 320, the time-of-flight camera 120 generates first metadata corresponding to the one or more first images. For example, the time-of-flight camera 120 generates the first metadata including a location and angle of positioning of the camera 320, a camera position (for example, height, orientation, and the like), a GPS location, and/or distances between the time-of-flight camera 120 and a plurality of points in the one or more first images. The distances are measured using the time-of-flight sensor 325 as discussed above. Once the first metadata is generated, the time-of-flight camera 120 transmits the first metadata to the 3D modeling server 110. In some embodiments, each of the one or more first images may be transmitted to the 3D modeling server 110 as a single file including the corresponding portion of the first metadata. That is, an image and the corresponding camera position, camera angle, distances to objects at the incident scene in the image may be transmitted as a single file.

The method 400 includes generating, using the electronic processor 210, a scene specific 3D model at a first resolution including a plurality of 3D points based on the one or more first images and the first metadata (at block 430). The electronic processor 210 executes the voxel builder application 260 to generate the 3D model using the one or more first images and the first metadata. The 3D model is generated as a voxel grid including the plurality of 3D points also known as voxels. Voxels are 3D equivalent of pixels in a two-dimensional (2D) representation. Voxels may be cubes or other polygons that make up the portions of the 3D representation. The method for generating a voxel grid using images and corresponding metadata is described with respect to FIGS. 5A-5C below.

The method 400 includes identifying, using the electronic processor 210, a first incident-specific point of interest from the one or more first images (at block 440). The electronic processor 210 executes the image recognition application 270 to identify one or more incident-specific points of interests in the one or more first images. The points of interests are specific to the incident. For example, a car crash incident may include a flat tire, a dent in the car body, and the like as points of interest. A homicide incident may include a body, blood, any objects that may have been used as a weapon, and the like as points of interest. The method 400 may include storing, on the memory 220 coupled to the electronic processor 210, a list of incident-specific objects of interest. The electronic processor 210 may then perform image recognition on the one or more first images based on the list of incident-specific objects of interest to identify the first incident-specific point of interest. An example technique for identifying incident-specific points of interest is described with respect to FIG. 6 below.

The method 400 includes transmitting, using the electronic processor 210, one or more first commands for recapturing the first incident-specific point of interest (at block 450). In the 3D model, it is advantageous to have points of interests represented at a higher resolution. Points of interests carry more information that is pertinent to the investigation compared to other portions of the incident scene. Accordingly, representing the points of interest at a higher resolution allows for creating an efficient 3D model of the incident scene. Once the points of interest are identified, the electronic processor 210 requests additional images and/or additional metadata of the point of interest for rendering the portion of the 3D model corresponding to the point of interest at a higher resolution. In one example, the requests are provided as voice commands to a portable communications device 130 associated with the time-of-flight camera 120. The requests may also be provided as instructions to the device carrying the time-of-flight camera 120. In some embodiments, the requests may be provided to another time-of-flight camera 120 at the incident scene other than the time-of-flight camera 120 that captured the one or more first images.

The method 400 includes receiving, at the electronic processor 210, one or more second images captured of the first incident-specific point of interest (at block 460). The camera 320 of the time-of-flight camera 120 captures the one or more second images at the incident scene. The one or more second images are captured based on a set of instructions provided to the public safety personnel or to the device capturing the images. The method for providing commands to the personnel capturing the one or more second images is described with respect to FIG. 7 below. Once the one or more second images are captured, the time-of-flight camera 120 transmits the one or more second images to the 3D modeling server 110.

The method 400 includes receiving, at the electronic processor 210, second metadata generated corresponding to the one or more second images (at block 470). At or around the same time as the one or more second images are being captured by the camera 320, the time-of-flight camera 120 generates second metadata corresponding to the one or more second images. For example, the time-of-flight camera 120 generates the second metadata including a camera angle, a camera position (for example, height, orientation, and the like), a GPS location, and/or distances between the time-of-flight camera 120 and the first point of interest for each of the one or more second images. The distances are measured using the time-of-flight sensor 325 as discussed above. Once the second metadata is generated, the time-of-flight camera 120 transmits the second metadata to the 3D modeling server 110.

In some embodiments, the method 400 also includes determining, using the electronic processor 210, a first capture criteria for each recapture of the first incident-specific point of interest. The first capture criteria includes, for example, a location of the time-of-flight camera 120, an angle of capture, a direction of capture, and/or the like. The first capture criteria is different from second capture criteria of the one or more first images. The one or more first commands sent to the portable communications device 130 include an instruction for capturing the one or more second images using the first capture criteria. The time-of-flight camera 120 associated with the portable communications device 130 can then be used to recapture the first incident-specific point of interest based on the first capture criteria.

The method 400 includes updating, using the electronic processor 210, a first portion of the scene specific 3D model corresponding to the first incident specific point of interest to a second resolution based on the one or more second images and the second metadata (at block 480). The electronic processor 210 defines a boundary for the first incident-specific point of interest. The boundary defines the first portion of the scene specific 3D model. The electronic processor 210 performs a cube divide operation on the first portion of the scene specific 3D model. The cube divide operation includes reducing the size of the voxels in the first portion. The size of the voxels is dependent on the resolution of the 3D model. For example, a first resolution is associated with a first voxel size (for example, volume) and a second resolution is associated with a second voxel size. The voxel size is inversely proportional to the resolution. Accordingly, the second voxel size is smaller than the first voxel size when the second resolution is larger than the first resolution. The electronic processor 210 uses the one or more second images and the second metadata to update the voxels (that is, reduced size voxels) in the first portion. The method 400 repeats for each incident-scene investigation.

In some embodiments, the method 400 also includes determining, using the electronic processor 210, for each recapture of the first incident-specific point of interest whether a predetermined quality criteria for the second resolution is met. The predetermined quality criteria may include criteria to ensure that the first portion of the 3D model can be updated to second resolution based on the captured images. The method 400 may include transmitting a second command indicating that updating the first portion of the scene specific 3D model corresponding to the first incident-specific point of interest has been completed in response to the predetermined quality criteria being met. The second command may be sent to the portable communications device 130 associated with the time-of-flight camera 120 capturing the one or more second images.

In some embodiments, the method 400 may include identifying additional points of interests. For example, the method 400 includes identifying, using the electronic processor 210, a second incident-specific point of interest from the one or more first images and/or the one or more second images. The electronic processor 210 executes the image recognition application 270 to identify one or more incident-specific points of interests in the one or more first images. The method 400 includes transmitting, using the electronic processor 210, one or more second commands for recapturing the second incident-specific point of interest. Once the additional second point of interest are identified, the electronic processor 210 requests additional images of the second point of interest for rendering the portion of the 3D model corresponding to the second point of interest at a higher resolution. In one example, the requests are provided as voice commands to a portable communications device 130 associated with the time-of-flight camera 120. The requests may also be provided as instructions to the device carrying the time-of-flight camera 120. In some embodiments, the requests may be provided to another time-of-flight camera 120 at the incident scene other than the time-of-flight camera 120 that captured the one or more first images and/or the one or more second images.

The method 400 further includes receiving, at the electronic processor 210, one or more third images captured of the second incident-specific point of interest and receiving, at the electronic processor 210, third metadata corresponding to the one or more third images. The method 400 includes updating, using the electronic processor 210, a second portion of the scene-specific 3D model corresponding to the second incident-specific point of interest to the second resolution based on the one or more third images and the third metadata when the second incident specific point of interest is identified from the one or more first images. The method 400 includes updating, using the electronic processor 210, a second portion of the scene-specific 3D model corresponding to the second incident-specific point of interest to a third resolution based on the one or more third images and the third metadata when the second incident specific point of interest is identified from the one or more second images. The third resolution is higher than the second resolution. The electronic processor 210 uses the one or more third images and the third metadata to update the voxels (that is, reduced size voxels) in the second portion.

In some embodiments, apart from identifying points of interest, the method 400 may also include determining, using the electronic processor 210, to extend a size of the scene specific 3D model based on the one or more first images. In some incidents, additional relevant information may be present in locations outside of the boundary defined by the electronic processor 210 for the incident. In these images, the electronic processor 210 may determine that the boundary may be extended to render the relevant portion of the incident scene.

The method 400 includes transmitting, using the electronic processor 210, one or more third commands for capturing an additional portion of the scene not previously captured in the one or more first images. Once the additional portion of the scene is identified, the electronic processor 210 requests additional images of the additional portion for rendering the 3D model corresponding to the first resolution. In one example, the requests are provided as voice commands to a portable communications device 130 associated with the time-of-flight camera 120. The requests may also be provided as instructions to the device carrying the time-of-flight camera 120. In some embodiments, the requests may be provided to another time-of-flight camera 120 at the incident scene other than the time-of-flight camera 120 that captured the one or more first images, the one or more second images, and/or the one or more third images.

The method 400 includes receiving, at the electronic processor 210, one or more fourth image captured of the additional portion of the incident scene and receiving, at the electronic processor 210, fourth metadata corresponding to the one or more fourth images. The method 400 includes updating, using the electronic processor 210, the scene specific 3D model at the first resolution to include the additional portion of the incident scene based on the one or more fourth images and the fourth metadata. The electronic processor 210 uses the one or more fourth images and the fourth metadata to update the voxels in the additional portion.

Figure 5A:
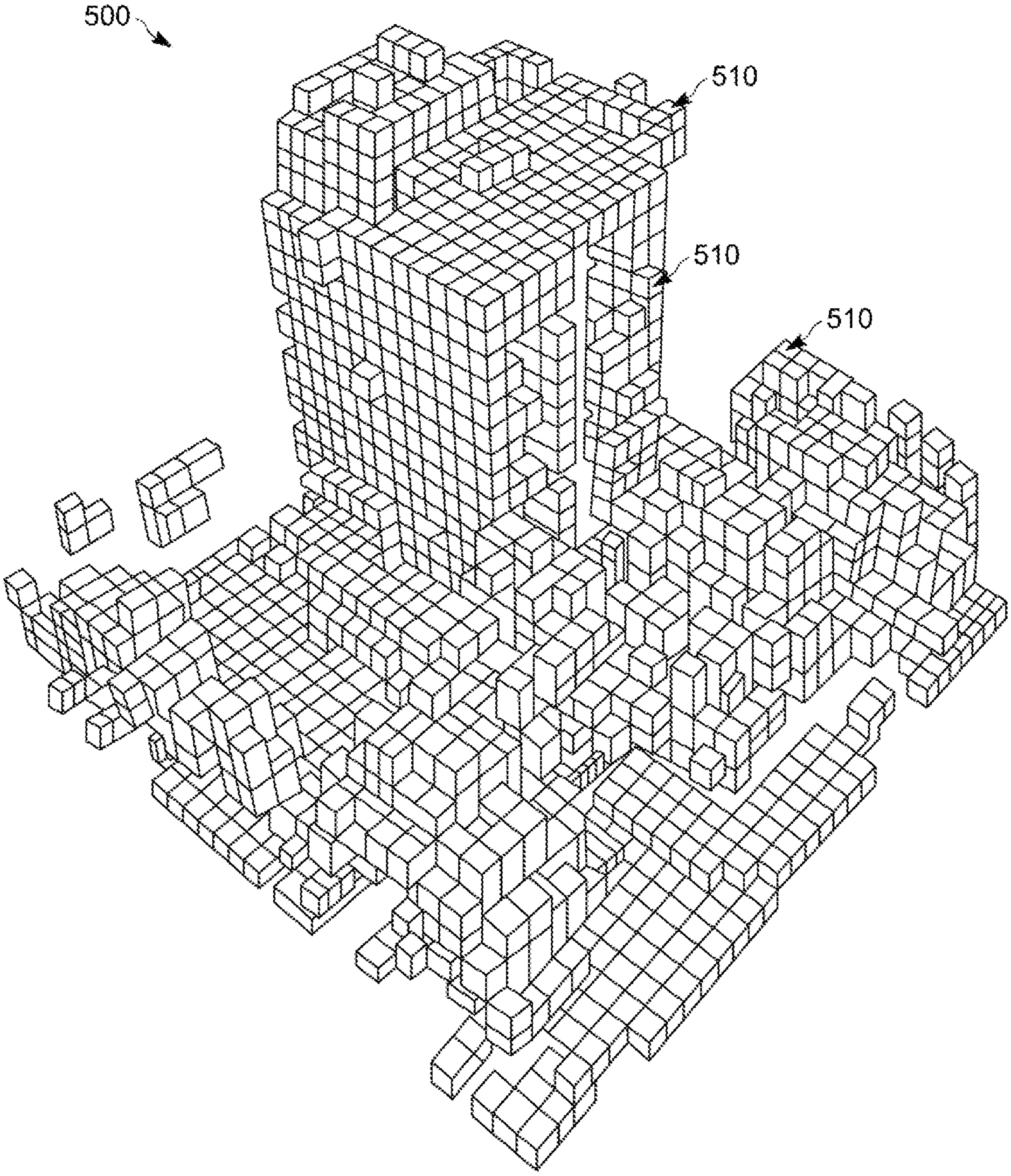
FIG. 5A-C illustrate an example 3D model generated by the 3D modeling server of FIG. 2 in accordance with some embodiments.

FIG. 5A illustrates an example voxel grid 500 including a plurality of voxels 510. The electronic processor 210 executes the voxel builder application 260 to render the voxel grids shown in FIGS. 5A-5C. The electronic processor 210 defines a boundary for the voxel grid based on the received one or more images. The boundary is then filled with voxels 510. Voxels 510 are cubes having a particular size (for example, side and/or volume) that is dependent on the desired resolution. The higher the resolution, the lower the size of the voxel 510. The electronic processor 210 then fills the voxels 510 with information (for example, color and/or material) based on the one or more first images and the corresponding first metadata.

Figure 5B:
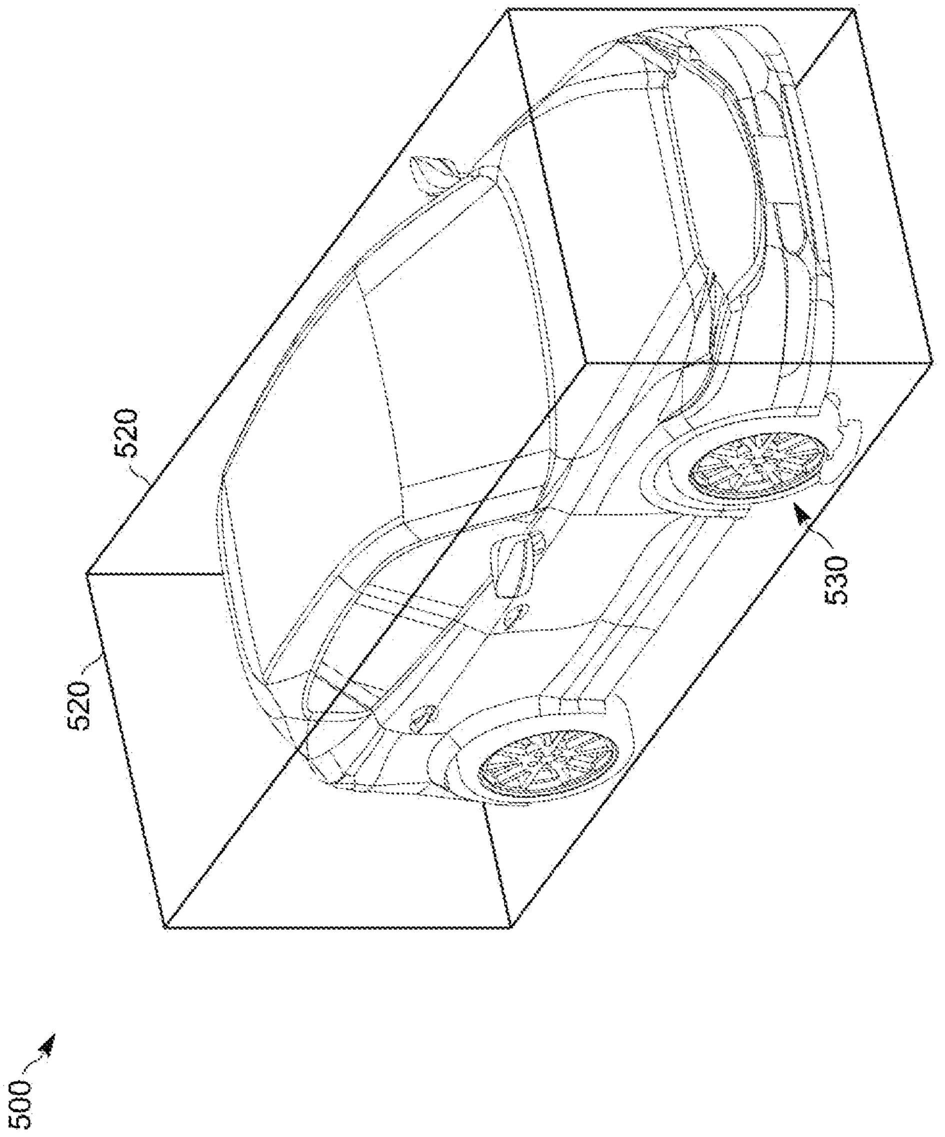

FIG. 5B illustrates an example of a car crash incident. The time-of-flight camera 120 captures images of the car crash incident from different angles and positions and sends the one or more first images and the first metadata to the 3D modeling server 110. The electronic processor 210 first defines the boundary 520 and fills the voxels to generate the 3D model of the car crash incident using the one or more first images and the corresponding first metadata.

The electronic processor 210 also identifies incident-specific points of interests from the one or more first images. The points of interest may be identified directly from the one or more first images or using the voxel grid 500 after building the voxel grid 500 from the one or more first images. In the example illustrated, the electronic processor 120 identifies the flat tire as a first incident-specific point of interest 530. Once a point of interest is identified, the electronic processor 210 performs a cube divide operation around the point of interest.

Figure 5C:
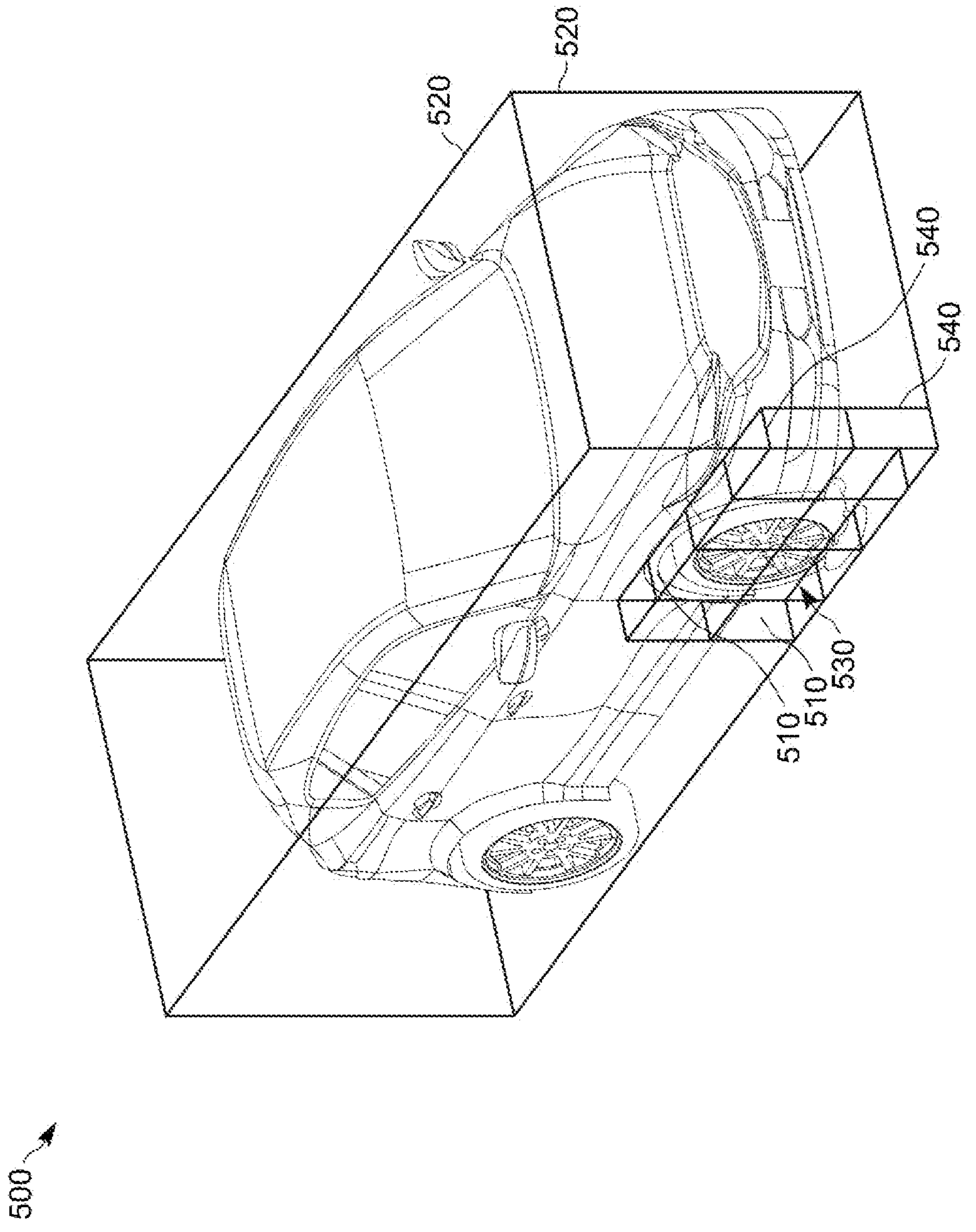

FIG. 5C illustrates an example of a cube divide operation around the first point of interest 530. The electronic processor 210 defines a boundary 540 for the first point of interest 530. The boundary defines the first portion of the scene specific 3D model. The electronic processor 210 performs a cube divide operation on the first portion of the scene specific 3D model. The cube divide operation includes reducing the size of the voxels in the first portion. The electronic processor 210 uses the one or more second images and the second metadata to update the voxels 510 (that is, reduced size voxels) in the first portion.

Figure 6:
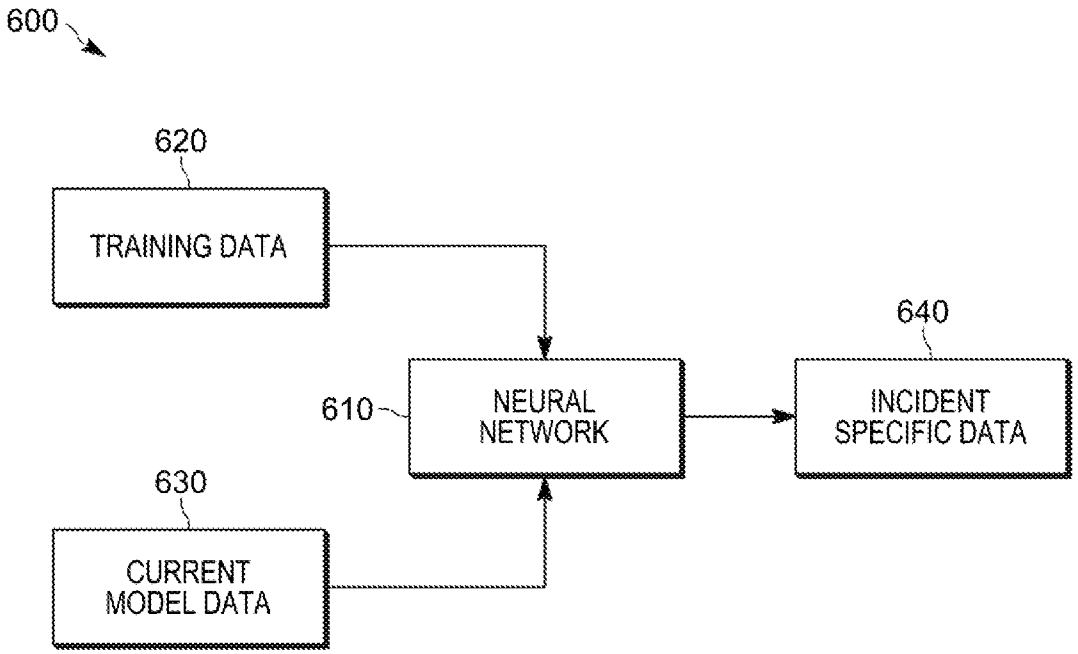
FIG. 6 is a data flow diagram of a neural network for performing image recognition in accordance with some embodiments.

As discussed above, the electronic processor 210 performs image recognition analysis on the on or more first images to identify incident-specific points of interest. FIG. 6 is a data flow diagram 600 of a neural network 610 implemented by the electronic processor 210 or in communication with the electronic processor 210 that facilitates image recognition. The electronic processor 210 executes the image recognition application 270 to perform the technique illustrated in FIG. 6. The neural network 610 is, for example, a special-purpose processor implemented for performing machine learning and recognition. The neural network 610 is initially trained using training data 620. The training data 620 includes, for example, a plurality of images pertaining to incident-specific points of interest. In one example, for a car crash incident, the neural network 610 is trained by providing a plurality of prior captured images of flat tires, and the like.

After the initial training, the neural network 610 receives current model data 630. The current model data 630 includes the one or more first images and/or the one or more second images captured of the incident scene. The neural network 610 compares the current model data 630 to the training data 620 to identify similarities and differences. The neural network outputs incident specific data 640 based on the image recognition analysis performed on the current model data 630. Specifically, the neural network 610 may automatically identify an incident type based on the current model data 630. The neural network 610 also identifies incident-specific points of interest based on the identified incident type and the current model data 630. The neural network 610 may further identify the requirements (for example, camera positioning, angles, and the like) for capturing the one or more second images. The neural network 610 outputs the incident type, the incident-specific points of interest, and the capture requirements as the incident specific data 640.

Figure 7:
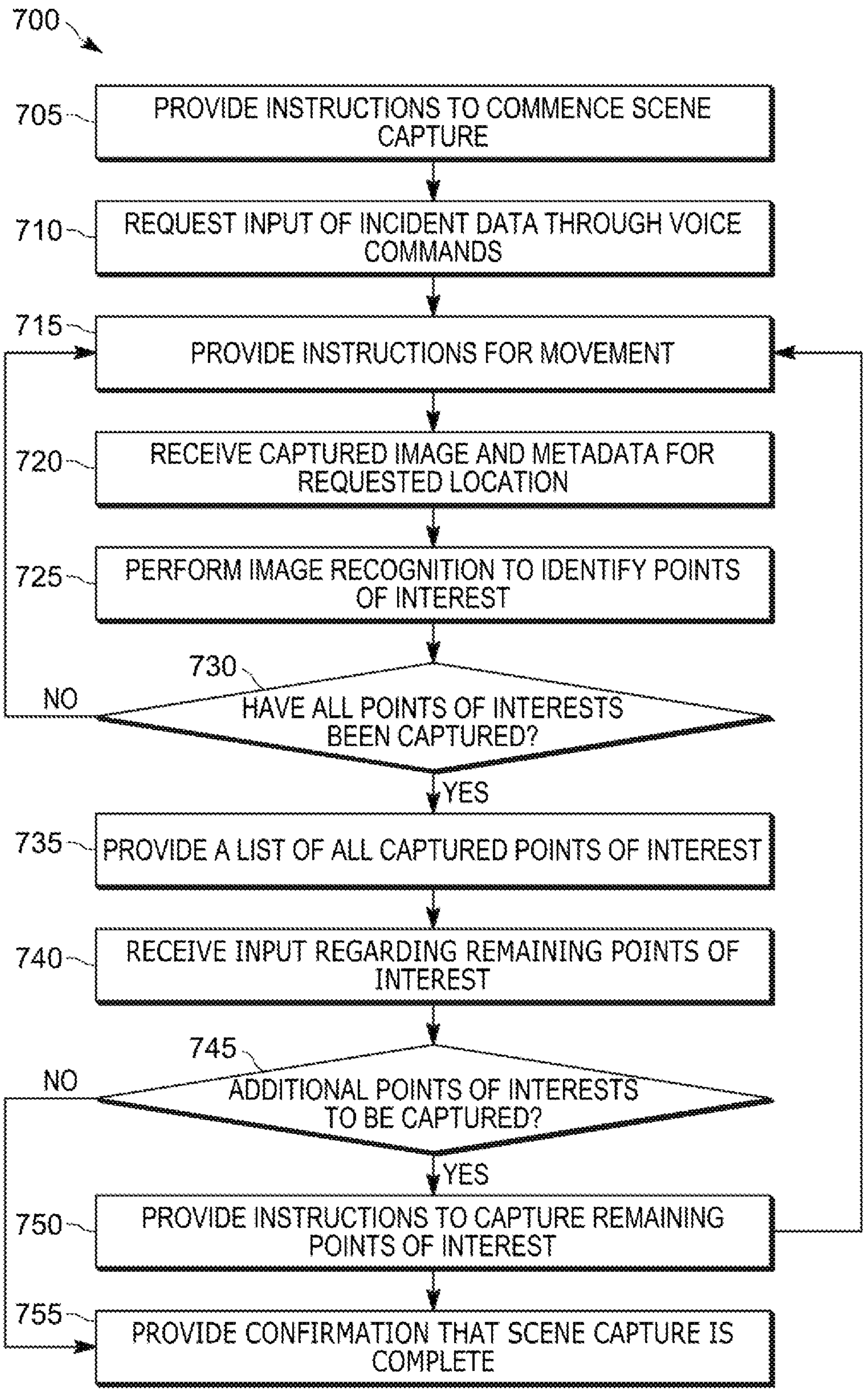
FIG. 7 is a flowchart of a method for providing instructions for image capture in accordance with some embodiments.

FIG. 7 is a flowchart of an example method 700 for providing instructions for capturing images at the incident scene. The electronic processor 210 executes the user experience application 280 to perform the method 700. The method 700 includes providing, using the electronic processor 210, instructions to commence scene capture (at block 705). When a public safety officer is at an incident scene, the officer's device may provide a GPS location of the officer to the 3D modeling server 110. The 3D modeling server 110 provides instructions to the officer to commence capture of the incident scene for 3D model generation.

The method 700 includes requesting, using the electronic processor 210, input of incident data through voice commands (at block 710). The electronic processor 210 may transmit commands to the Officer's portable communications device 130 to provide the inputs. The inputs include, for example, incident type, identification of the officer, and/or the like. The Office may input the commands by speaking into the portable communications device 130

The method 700 includes providing, using the electronic processor 210, instructions for movement (at block 715). The electronic processor 210 determines the requirements or guidelines for capturing images of the scene and/or one or more points of interests and provides instructions as voice commands to the Officer. The voice commands are provided through the Officer's portable communications device 130. The voice commands may include instructions to move to a particular location, place the camera 320 in a particular angle, and the like.

The method 700 includes receiving, at the electronic processor 210, captured images and corresponding metadata for a requested location (at block 720). Once the Officer captures the images as instructed, the images and the corresponding metadata are provided to the 3D modeling server 110 from the time-of-flight camera 120 either directly or through the associated portable communications device 130.

The method 700 includes performing, using the electronic processor 210, image recognition to identify points of interest (at block 725). As discussed above with respect to FIG. 6, the electronic processor 210 uses image recognition techniques to identify points of interests from the received one or more images.

The method 700 includes determining, using the electronic processor 210, whether all points of interests have been captured (at block 730). The electronic processor 210 determines whether images corresponding to all identified points of interest have been received at the 3D modeling server 110. When there are still one or images left to be captured of a scene or a point of interest, the method 700 returns to block 715 to instruct the Office to capture the additional images.

When the electronic processor 210 determines that all points of interests have been captured, the method 700 includes providing, using the electronic processor 210, a list of all captured points of interest (at block 735). The list of captured points of interest may be displayed on the Officer's portable communications device 130. This allows the officer to identify any additional points of interest that may have been missed by the 3D modeling server 110. The method 700 includes receiving, at the electronic processor 210, input regarding remaining points of interest (at block 740). The Office may provide the input using voice commands through the Officer's portable communications device 130.

The method 700 includes determining, using the electronic processor 210, whether any additional points of interest are to be captured (at block 745). The electronic processor 210 receives the Officer's voice commands regarding whether any additional points of interests that remain to be captured. When there are additional points of interest to be captured, the method 700 includes providing instructions to capture the remaining points of interest (at block 750). The electronic processor 210 may determine the requirements or guidelines for capturing the additional points of interest. The method 700 returns to block 715 to capture the additional points of interest.

When the user confirms that there are no additional points of interest to be captured, the method 700 includes providing, using the electronic processor 210, confirmation that the scene capture is complete (at block 755). The electronic processor 210 may provide the confirmation as a voice command through the Officer's portable communications device 130. In some embodiments, the confirmation may be displayed on the Officer's portable communications device 130.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for generating a three-dimensional (3D) model, comprising:

receiving, at an electronic processor, one or more first images captured by a camera corresponding to an incident scene;

receiving, at the electronic processor, first metadata generated by a time-of-flight sensor corresponding to the one or more first images;

generating, using the electronic processor, a scene specific 3D model at a first resolution including a plurality of 3D points based on the one or more first images and the first metadata;

identifying, using the electronic processor, a first incident-specific point of interest from the one or more first images;

transmitting, using the electronic processor, one or more first commands for recapturing the first incident-specific point of interest;

receiving, at the electronic processor, one or more second images captured of the first incident-specific point of interest;

receiving, at the electronic processor, second metadata generated corresponding to the one or more second images;

updating, using the electronic processor, a first portion of the scene specific 3D model corresponding to the first incident-specific point of interest to a second resolution based on the one or more second images and the second metadata, the second resolution being higher than the first resolution;

determining, using the electronic processor, to extend a size of the scene specific 3D model based on the one or more first images;

transmitting, using the electronic processor, one or more third commands for capturing an additional portion of the incident scene not previously captured in the one or more first images;

receiving, at the electronic processor, one or more fourth images captured of the additional portion of the incident scene; and updating, using the electronic processor, the scene specific 3D model at the first resolution to include the additional portion of the incident scene based on the one or more fourth images.

2. The method of claim 1, further comprising:

determining for each recapture of the first incident-specific point of interest, a first capture criteria different than a second capture criteria of the one or more first images, wherein the one or more first commands includes an instruction for capturing the one or more second images using the first capture criteria; and recapturing the first incident-specific point of interest based on the first capture criteria.

3. The method of claim 2, further comprising:

determining, using the electronic processor, for each recapture whether a predetermined quality criteria for the second resolution is met; and transmitting a second command indicating that updating the first portion of the scene specific 3D model corresponding to the first incident-specific point of interest has been completed in response to the predetermined quality criteria being met.

4. The method of claim 2, wherein the first capture criteria includes one or more selected from the group consisting of a location of the camera, an angle of capture, and a direction of capture.

5. The method of claim 1, wherein the first metadata includes time-of-flight data indicating distances between the time-of-flight sensor and a plurality of points in the one or more first images, wherein the first metadata also identifies a location and an angle of positioning of the camera when the one or more first images are captured.

6. The method of claim 1, further comprising:

identifying, using the electronic processor, a second incident-specific point of interest from the one or more first images;

transmitting, using the electronic processor, one or more second commands for recapturing the second incident-specific point of interest;

receiving, at the electronic processor, one or more third images captured of the second incident-specific point of interest;

receiving, at the electronic processor, third metadata corresponding to the one or more third images; and updating, using the electronic processor, a second portion of the scene specific 3D model corresponding to the second incident-specific point of interest to the second resolution based on the one or more third images and the third metadata.

7. The method of claim 1, further comprising:

identifying, using the electronic processor, a second incident-specific point of interest from the one or more second images;

transmitting, using the electronic processor, one or more second commands for recapturing the second incident-specific point of interest;

receiving, at the electronic processor, one or more third images captured of the second incident-specific point of interest;

receiving, at the electronic processor, third metadata corresponding to the one or more third images; and updating, using the electronic processor, a second portion of the scene specific 3D model corresponding to the second incident-specific point of interest to a third resolution based on the one or more third images and the third metadata.

8. The method of claim 1, further comprising:

receiving, at the electronic processor, fourth metadata corresponding to the one or more fourth images; and updating, using the electronic processor, the scene specific 3D model at the first resolution to include the additional portion of the incident scene based on the one or more fourth images and the fourth metadata.

9. The method of claim 1, further comprising:

storing, on a memory coupled to the electronic processor, a list of incident-specific objects of interest; and performing, using the electronic processor, image recognition on the one or more first images based on the list of incident-specific objects of interest to identify the first incident- specific point of interest.

10. A three-dimensional (3D) modeling server for generating a 3D model, the 3D modeling server comprising:

a transceiver enabling communication between the 3D modeling server, a camera, and a time-of-flight sensor;

an electronic processor coupled to the transceiver and configured to receive, one or more first images captured by the camera corresponding to an incident scene;

receive first metadata generated by the time-of-flight sensor corresponding to the one or more first images;

generate an scene specific 3D model at a first resolution including a plurality of 3D points based on the one or more first images and the first metadata;

identify a first incident-specific point of interest from the one or more first images;

transmit one or more first commands for recapturing the first incident-specific point of interest;

receive one or more second images captured of the first incident-specific point of interest;

receive second metadata generated corresponding to the one or more second images;

update a first portion of the scene specific 3D model corresponding to the first incident-specific point of interest to a second resolution based on the one or more second images and the second metadata, the second resolution being higher than the first resolution;

determine to extend a size of the scene specific 3D model based on the one or more first images;

transmit one or more third commands for capturing an additional portion of the incident scene not previously captured in the one or more first images;

receive one or more fourth images captured of the additional portion of the incident scene; and update the scene specific 3D model at the first resolution to include the additional portion of the incident scene based on the one or more fourth images.

11. The 3D modeling server of claim 10, wherein the electronic processor is further configured to determine for each recapture of the first incident-specific point of interest, a first capture criteria different than a second capture criteria of the one or more first images, wherein the one or more first commands includes an instruction for capturing the one or more second images using the first capture criteria.

12. The 3D modeling server of claim 11, wherein the electronic processor is further configured to determine for each recapture whether a predetermined quality criteria for the second resolution is met; and transmit a second command indicating that updating the first portion of the scene specific 3D model corresponding to the first incident-specific point of interest has been completed in response to the predetermined quality criteria being met.

13. The 3D modeling server of claim 11, wherein the first capture criteria includes one or more selected from the group consisting of a location of the camera, an angle of capture, and a direction of capture.

14. The 3D modeling server of claim 10, wherein the first metadata includes time-of-flight data indicating distances between the time-of-flight sensor and a plurality of points in the one or more first images, wherein the first metadata also identifies a location and an angle of positioning of the camera when the one or more first images are captured.

15. The 3D modeling server of claim 10, wherein the electronic processor is further configured to identify a second incident-specific point of interest from the one or more first images;

transmit one or more second commands for recapturing the second incident-specific point of interest;

receive one or more third images captured of the second incident-specific point of interest;

receive third metadata corresponding to the one or more third images; and update a second portion of the scene specific 3D model corresponding to the second incident-specific point of interest to the second resolution based on the one or more third images and the third metadata.

16. The 3D modeling server of claim 10, wherein the electronic processor is further configured to identify a second incident-specific point of interest from the one or more second images;

transmit one or more second commands for recapturing the second incident-specific point of interest;

receive one or more third images captured of the second incident-specific point of interest;

receive third metadata corresponding to the one or more third images; and update a second portion of the scene specific 3D model corresponding to the second incident-specific point of interest to a third resolution based on the one or more third images and the third metadata.

17. The 3D modeling server of claim 10, further comprising:

receive fourth metadata corresponding to the one or more fourth images; and update the scene specific 3D model at the first resolution to include the additional portion of the incident scene based on the one or more fourth images and the fourth metadata.

18. The 3D modeling server of claim 10, wherein the electronic processor is further configured to store, on a memory coupled to the electronic processor, a list of incident-specific objects of interest; and perform image recognition on the one or more first images based on the list of incident-specific objects of interest to identify the first incident-specific point of interest.

19. The 3D modeling server of claim 10, wherein the 3D model is generated as a voxel grid, wherein first voxel size of the voxel grid at the first resolution is greater than second voxel size of the voxel grid at the second resolution.

20. The method of claim 1, wherein the 3D model is generated as a voxel grid, wherein first voxel size of the voxel grid at the first resolution is greater than second voxel size of the voxel grid at the second resolution.

* * * * *